US012417702B2

(12) United States Patent
Kim

(10) Patent No.: US 12,417,702 B2
(45) Date of Patent: Sep. 16, 2025

(54) THREE-WAY PARKING CONTROL CAMERA APPARATUS WITH PARKING SPACE DISPLAYING FUNCTION

(71) Applicant: IDIS CO., LTD., Daejeon-si (KR)

(72) Inventor: Jin Woo Kim, Seoul (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 18/387,886

(22) Filed: Nov. 8, 2023

(65) Prior Publication Data

US 2024/0161617 A1 May 16, 2024

(30) Foreign Application Priority Data

Nov. 11, 2022 (KR) .......................... 10-2022-0150791

(51) Int. Cl.
*H04N 23/60* (2023.01)
*G08G 1/14* (2006.01)
*H04N 23/90* (2023.01)
*G06V 20/52* (2022.01)

(52) U.S. Cl.
CPC ............. *G08G 1/142* (2013.01); *H04N 23/60* (2023.01); *H04N 23/90* (2023.01); *G06V 20/52* (2022.01)

(58) Field of Classification Search
None
See application file for complete search history.

(56) References Cited

U.S. PATENT DOCUMENTS

2019/0213883 A1* 7/2019 Kim ....................... G08G 1/005
2021/0179057 A1* 6/2021 Shingai ..................... B60T 7/22

FOREIGN PATENT DOCUMENTS

| KR | 20-0477863 Y1 | 7/2015 |
| KR | 10-2016-0049702 A | 5/2016 |
| KR | 10-1980692 B | 5/2019 |
| KR | 10-2010408 B | 8/2019 |
| KR | 10-2020-0008807 A | 1/2020 |

OTHER PUBLICATIONS

Non-final Office Action mailed on Jul. 1, 2024 from the Korean Patent Office for Korean Application No. 10-2022-0150791 and its English translation.
Korean Office Action dated Jan. 16, 2025 for Application No. 10-2022-0150791.

* cited by examiner

*Primary Examiner* — Eileen M Adams
(74) *Attorney, Agent, or Firm* — Insight Law Group, PLLC; Seung Lee

(57) ABSTRACT

A three-way parking control camera apparatus with a parking space displaying function is provided and allows occupants in a vehicle entering from a front side of a parking passage to easily recognize the direction of parking areas on both sides of the parking passage where there is an empty parking space.

10 Claims, 7 Drawing Sheets

THREE-WAY PARKING CONTROL CAMERA APPARATUS WITH PARKING SPACE DISPLAYING FUNCTION

CROSS-REFERENCE TO RELATED APPLICATION(S)

This application claims priority from Korean Patent Application No. 10-2022-0150791, filed on Nov. 11, 2022, in the Korean Intellectual Property Office, the disclosure of which is incorporated herein by reference in its entirety.

BACKGROUND

1. Field

The following description relates to a parking control camera, and more particularly, to a three-way parking control camera apparatus with a parking space displaying function.

2. Description of Related Art

Korean Registered Utility Model No. 20-0477863 (published on Jul. 30, 2015) discloses a parking camera including a printed circuit board (PCB) on which a plurality of light-emitting diodes (LEDs) are mounted and which receives power to drive the LEDs, a reflector which is disposed above the PCB and diffuses light of the LEDs, and a camera disposed below the PCB.

According to this technology, the LEDs emit red light when parking surfaces are full, emit green light when parking surfaces are general vehicle parking surfaces, emit blue light when parking surfaces are very important person (VIP) vehicle parking surfaces, and emit yellow light when parking surfaces are disabled person vehicle parking surfaces so that users using a parking lot can easily find empty parking zones.

However, a parking control camera using the conventional LED lighting simply displays whether a parking space is present, but has a problem of not showing where the empty parking space is present in the parking zone.

Therefore, the present inventors researched a three-way parking control camera apparatus with a parking space displaying function that allows occupants in vehicles entering from a front side of a parking passage to easily recognize the direction within parking areas on both sides of the parking passage in which there is an empty parking space.

RELATED ART DOCUMENT

Patent Document

Korean Registered Utility Model No. 20-0477863 (published on Jul. 30, 2015)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a three-way parking control camera apparatus with a parking space displaying function that allows occupants in vehicles entering from a front side of a parking passage to easily recognize the direction with parking areas on both sides of the parking passage in which there is an empty parking space.

In one general aspect, there is provided a three-way parking control camera apparatus with a parking space displaying function, which is installed at a center of a parking passage to inform an occupant of a vehicle entering from a front side of the parking passage about a parking space situation on both sides of the parking passage, the three-way parking control camera apparatus including a front camera configured to monitor forward to identify a vehicle entering from the front side of the parking passage, a left camera configured to monitor leftward to identify a parking space situation in a left parking area on a left side of the parking passage, a right camera configured to monitor rightward to identify a parking space situation in a right parking area on a right side of the parking passage, a front lighting part configured to emit light to allow the vehicle entering from the front side of the parking passage to recognize the parking space situation, a left lighting part configured to emit light to allow the vehicle entering from the front side of the parking passage to recognize whether a parking space is present in the left parking area, a right lighting part configured to emit light to allow the vehicle entering from the front side of the parking passage to recognize whether a parking space is present in the right parking area, and a controller configured to entirely control device functions including camera control and lighting control.

The controller may determine whether an empty parking space is present in the left parking area or the right parking area from a left parking area image captured by the left camera and a right parking area image captured by the right camera, and when an empty parking space is present in the left or right parking area, the controller may control the front lighting part to emit first color light, and when no empty parking space is present in the left or right parking area, the controller may control the front lighting part to emit second color light.

When an empty parking space is present only in the left parking area and no empty parking space is present in the right parking area, the controller may control the left lighting part to emit the first color light and control the right lighting part to emit the second color light.

When no empty parking space is present in the left parking area and an empty parking space is present only in the right parking area, the controller may control the left lighting part to emit the second color light and control the right lighting part to emit the first color light.

When empty parking spaces are present in both of the left parking area and the right parking area, the controller may control both of the left lighting part and the right lighting part to emit the first color light.

When no empty parking spaces are present in either of the left parking area and the right parking area, the controller may control both of the left lighting part and the right lighting part to emit the second color light.

The front lighting part may include a plurality of front lighting light-emitting diodes (LEDs) configured to emit light vertically toward the ground, and a front light-transmitting panel which prevents the plurality of front lighting LEDs from being exposed to the outside and transmits light from the plurality of front lighting LEDs to allow the vehicle entering from the front side of the parking passage to recognize the light.

The left lighting part or the right lighting part may include a plurality of left lighting LEDs or a plurality of right lighting LEDs configured to emit light horizontally toward the ground, and a left light-transmitting panel or a right light-transmitting panel which prevents the plurality of left lighting LEDs or the plurality of right lighting LEDs from being exposed to the outside and which transmits light of the plurality of left lighting LEDs or the plurality of right lighting LEDs to allow the vehicle entering from the front side of the parking passage to recognize the light.

The front light-transmitting panel may be implemented in a form in which both ends are inserted into and coupled to the left light-transmitting panel and the right light-transmitting panel and is implemented to transmit light of the plurality of left lighting LEDs or the plurality of right lighting LEDs to the front side of the parking passage through bump portions of the left light-transmitting panel and the right light-transmitting panel, which are formed through the coupling with the front light-transmitting panel, thereby allowing the vehicle entering from the front side of the parking passage to recognize the light.

The three-way parking control camera apparatus with a parking space displaying function may further include a body on which the front camera, the left camera, the right camera, the front lighting part, the left lighting part, the right lighting part, and the controller are mounted, and a body-fixing part camera formed on an upper portion of the body and connected to a ceiling structure at the center of the parking passage through a clamp connection method.

Other features and aspects will be apparent from the following detailed description, the drawings, and the claims.

Figure 1:
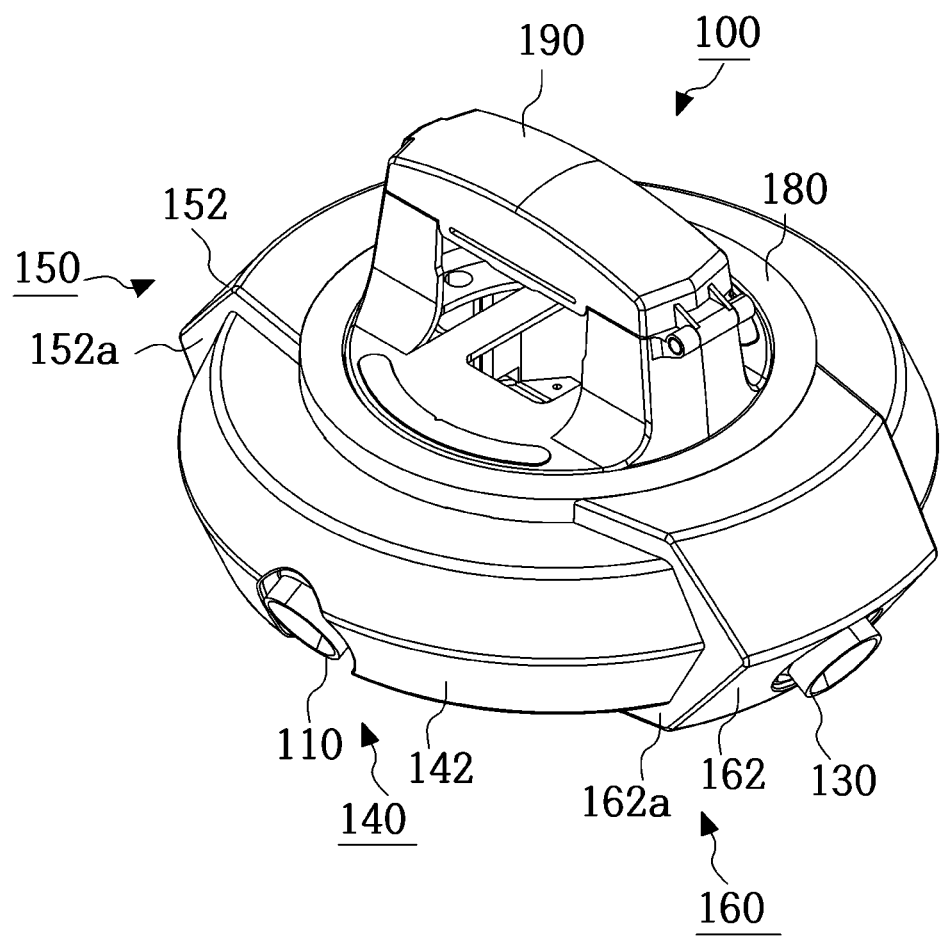
FIG. 1 is a perspective view illustrating a configuration of a three-way parking control camera apparatus with a parking space displaying function according to one embodiment of the present invention.
Figure 2:
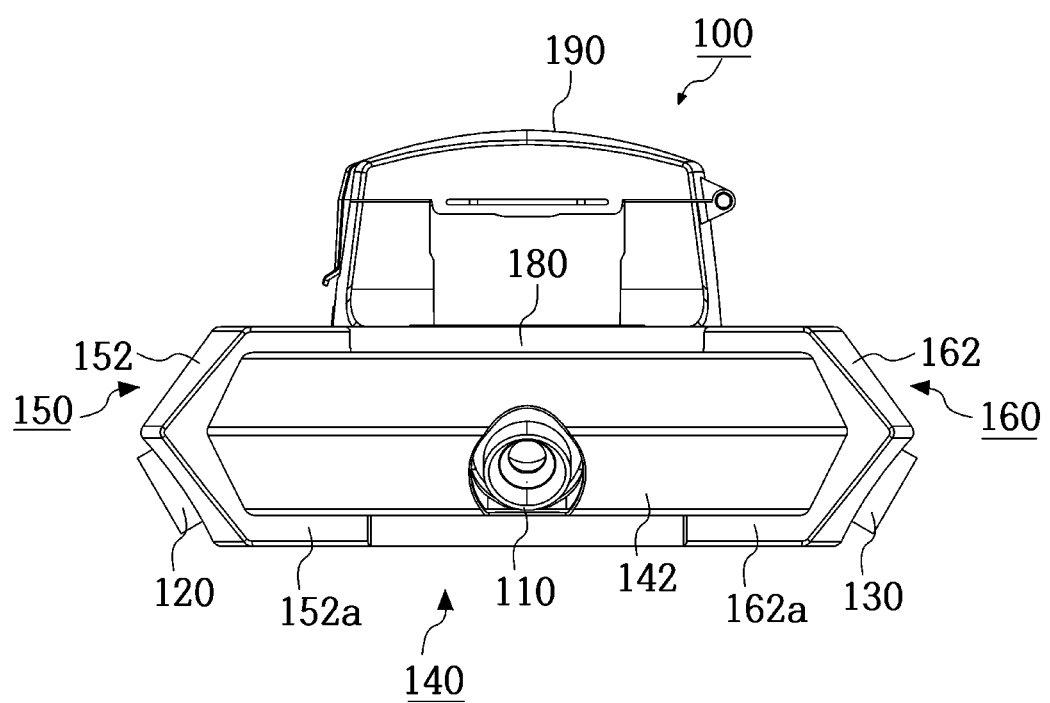
FIG. 2 is a front view illustrating the configuration of the three-way parking control camera apparatus with a parking space displaying function according to one embodiment of the present invention.
Figure 3:
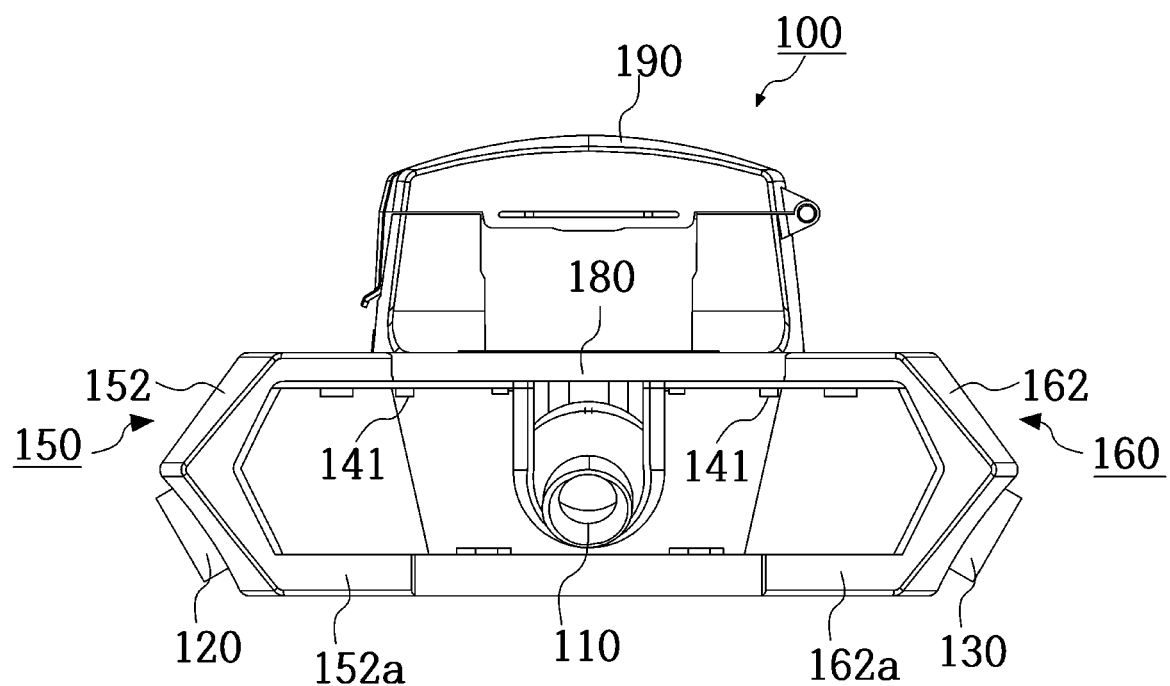
FIG. 3 is a partially cut-away front view illustrating the configuration of the three-way parking control camera apparatus with a parking space displaying function according to one embodiment of the present invention.
Figure 4:
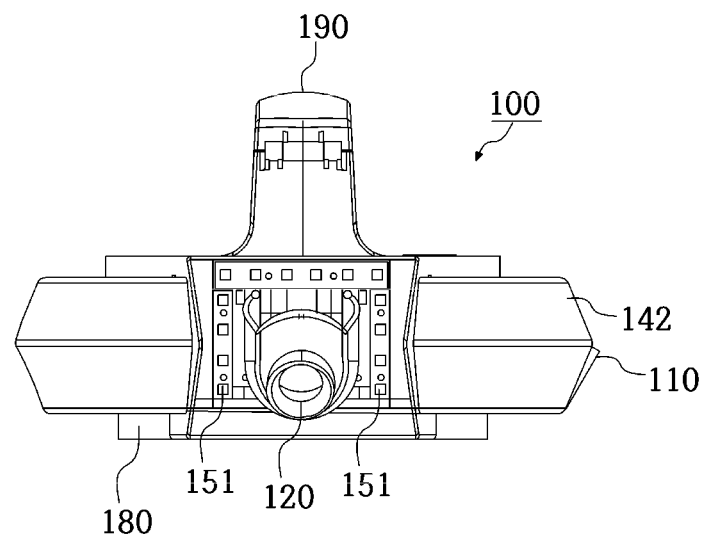
FIG. 4 is a partially cut-away side view illustrating the configuration of the three-way parking control camera apparatus with a parking space displaying function according to one embodiment of the present invention.
Figure 4:
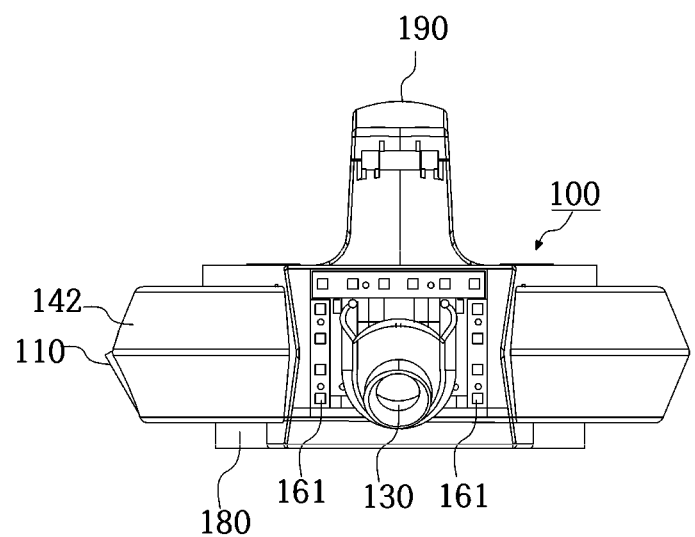

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Also, descriptions of well-known functions and constructions may be omitted for increased clarity and conciseness.

When a first component is referred to as being "connected" or "coupled" to a second component, the first component may be directly connected or coupled to the second component, but it should be understood that a third component may be present between the first component and the second component.

Conversely, when a first component is referred to as being "directly connected" or "directly coupled" to a second component, it should be understood that a third component may not be present between the first component and the second component.

FIGS. 1 to 4 are a perspective view, a front view, a partially cut-away front view, and a partially cut-away side view, respectively, illustrating a configuration of a three-way parking control camera apparatus with a parking space displaying function according to one embodiment of the present invention.

The three-way parking control camera apparatus with a parking space displaying function according to the present invention is installed at the center of a parking passage to inform an occupant of a vehicle entering from a front side of the parking passage about a parking space situation on both sides of the parking passage. As shown in FIGS. 1 to 4, the three-way parking control camera apparatus includes a front camera 110, a left camera 120, a right camera 130, a front lighting part 140, a left lighting part 150, a right lighting part 160, and a controller 170.

The front camera 110 is installed to monitor forward to identify vehicles entering from a front side of a parking passage. In this case, the front camera 110 may include a lens which forms an optical image of the front side of the parking passage, and an image sensor which converts the optical image formed by the lens into an electrical signal.

The left camera 120 is installed to monitor leftward to identify a parking space situation in a left parking area on a left side of the parking passage. In this case, the left camera 120 may include a lens which forms an optical image of the left parking area on the left side of the parking passage, and an image sensor which converts the optical image formed by the lens into an electrical signal.

The right camera 130 is installed to monitor rightward to identify a parking space situation in a right parking area on a right side of the parking passage. In this case, the right camera 130 may include a lens which forms an optical image of the right parking area on the right side of the parking passage, and an image sensor which converts the optical image formed by the lens into an electrical signal.

The front lighting part 140 emits light to allow the vehicles entering from the front side of the parking passage to recognize the parking space situation. In this case, the front lighting part 140 may include a plurality of front lighting LEDs 141 which emit light vertically toward the ground, and a front light-transmitting panel 142 which prevents the plurality of front lighting LEDs from being exposed to the outside and transmits light from the plurality of front lighting LEDs to allow the vehicles entering from the front side of the parking passage to recognize the light.

The left lighting part 150 emits light to allow the vehicles entering from the front side of the parking passage to recognize whether a parking space is present in the left parking area. In this case, the left lighting part 150 may include a plurality of left lighting LEDs 151 which emit light horizontally toward the ground, and a left light-transmitting panel 152 which prevents the plurality of left lighting LEDs from being exposed to the outside and transmits light from the plurality of left lighting LEDs to allow the vehicles entering from the front side of the parking passage to recognize the light.

The right lighting part 160 emits light to allow the vehicles entering from the front side of the parking passage to recognize whether a parking space is present in the right parking area. In this case, the right lighting part 160 may include a plurality of right lighting LEDs 161 which emit light horizontally toward the ground, and a right light-transmitting panel 162 which prevents the plurality of right lighting LEDs from being exposed to the outside and transmits light from the plurality of right lighting LEDs to allow the vehicles entering from the front side of the parking passage to recognize the light.

Specifically, the front light-transmitting panel 142 may be implemented in a form in which both ends are inserted into and coupled to the left light-transmitting panel 152 and the right light-transmitting panel 162 and may be implemented to transmit light of the plurality of left lighting LEDs or the plurality of right lighting LEDs to the front side of the parking passage through bump portions 152a and 162a of the left light-transmitting panel and the right light-transmitting panel, which are formed through the coupling with the front light-transmitting panel, thereby allowing the vehicles entering from the front side of the parking passage to recognize the light.

The controller 170 entirely controls a device performing camera control and lighting control. In this case, a function of the controller 170 may be implemented in the three-way parking control camera apparatus 100 with a parking space displaying function or may be implemented on a control server (not shown in the drawings).

Specifically, the controller 170 determines whether an empty parking space is present in the left parking area or the right parking area from a left parking area image captured by the left camera 120 and a right parking area image captured by the right camera 130, and when an empty parking space is present in the left or right parking area, the controller 170 may control the front lighting part 140 to emit first color light, and when no empty parking space is present in the left or right parking area, the controller 170 may control the front lighting part 140 to emit second color light.

In this case, the first color light may be green light and the second color light may be red light, and an algorithm for determining whether an empty parking space is present by analyzing the image captured by the camera is a common technology that was already known in various ways prior to the present application, and thus a detailed description thereof will be omitted.

Meanwhile, when an empty parking space is present only in the left parking area and no empty parking space is present in the right parking area, the controller 170 may control the left lighting part 150 to emit the first color light and control the right lighting part 160 to emit the second color light.

Figure 5:
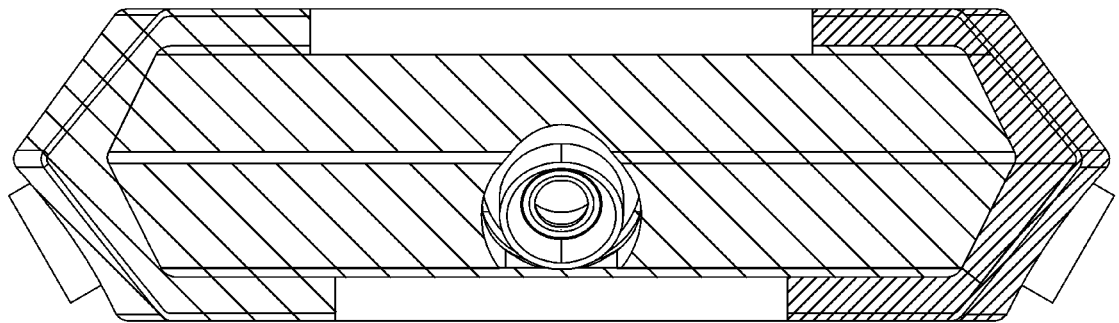
FIG. 5 is a diagram illustrating a lighting state in which an empty parking space is present only in a left parking area of the three-way parking control camera apparatus with a parking space displaying function according to the present invention, and no empty parking space is present in a right parking area thereof.

FIG. 5 is a diagram illustrating a lighting state in which an empty parking space is present only in a left parking area of the three-way parking control camera apparatus with a parking space displaying function according to the present invention, and no empty parking space is present in a right parking area thereof.

Referring to FIG. 5, from a point of view of the occupant of the vehicle entering the parking passage, since the front lighting part 140 and the left lighting part 150 emit the first color light, and the right lighting part 160 emits the second color light, due to a lighting combination of the front lighting part 140 and the left lighting part 150, a first color area is much larger than a second color area, and a first color shape forms a left arrow so that the occupant of the vehicle entering the parking passage can clearly recognize that an empty parking space is present in the left parking area.

On the other hand, when no empty parking space is present in the left parking area and an empty parking space is present only in the right parking area, the controller 170 may control the left lighting part 150 to emit the second color light and control the right lighting part 160 to emit the first color light.

Figure 6:
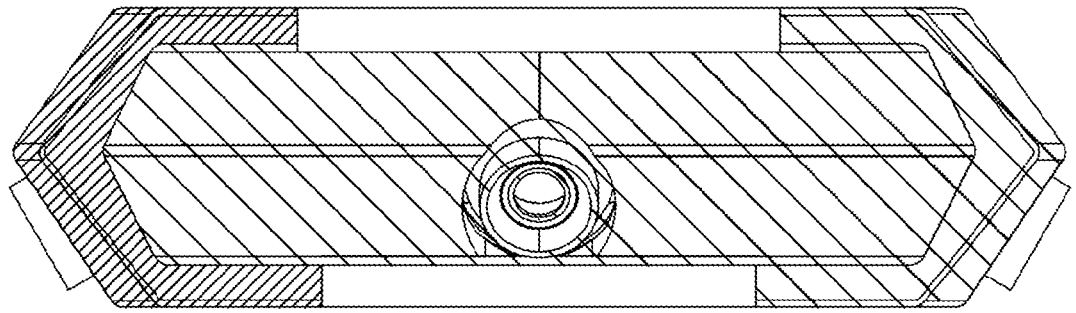
FIG. 6 is a diagram illustrating a lighting state in which no empty parking space is present in the left parking area of the three-way parking control camera apparatus with a parking space displaying function according to the present invention, and an empty parking space is present only in the right parking area thereof.

FIG. 6 is a diagram illustrating a lighting state in which no empty parking space is present in the left parking area of the three-way parking control camera apparatus with a parking space displaying function according to the present invention, and an empty parking space is present only in the right parking area thereof.

Referring to FIG. 6, from a point of view of the occupant of the vehicle entering the parking passage, since the front lighting part 140 and the right lighting part 160 emit the first color light, and the left lighting part 150 emits the second color light, due to a lighting combination of the front lighting part 140 and the right lighting part 160, a first color area is much larger than a second color area, and a first color shape forms a right arrow so that the occupant of the vehicle entering the parking passage can clearly recognize that an empty parking space is present in the right parking area.

Meanwhile, when empty parking spaces are present in both of the left parking area and the right parking area, the controller 170 may control both of the left lighting part 150 and the right lighting part 160 to emit the first color light.

Figure 7:
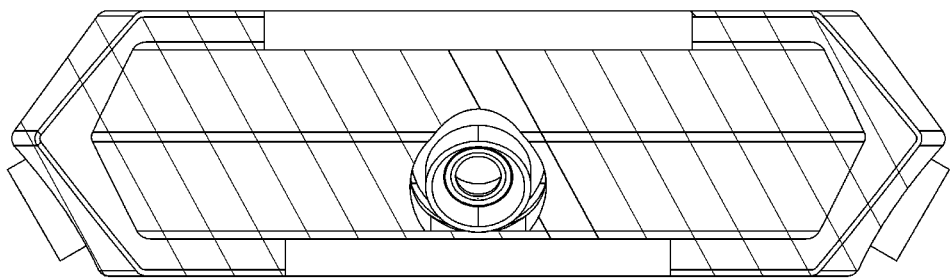
FIG. 7 is a diagram illustrating a lighting state in which empty parking spaces are present in both of the left parking area and the right parking area of the three-way parking control camera apparatus with a parking space displaying function according to the present invention.

FIG. 7 is a diagram illustrating a lighting state in which empty parking spaces are present in both of the left parking area and the right parking area of the three-way parking control camera apparatus with a parking space displaying function according to the present invention.

Referring to FIG. 7, from a point of view of the occupant of the vehicle entering the parking passage, since the front lighting part 140, the left lighting part 150, and the right lighting part 160 all emit the first color light, due to a lighting combination of the front lighting part 140, the left lighting part 150, and the right lighting part 160, a first color shape forms an arrow on both left and right sides so that the occupant of the vehicle entering the parking passage can clearly recognize that empty parking spaces are present in the left and right parking areas.

On the other hand, when no empty parking spaces are present in either of the left parking area and the right parking area, the controller 170 may control both of the left lighting part 150 and the right lighting part 160 to emit the second color light.

Figure 8:
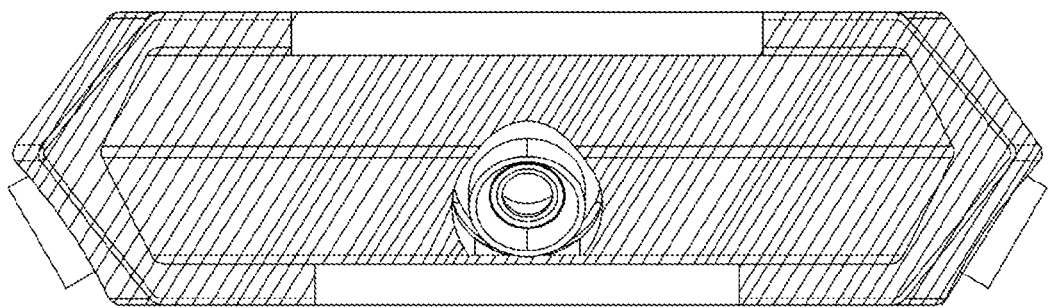
FIG. 8 is a diagram illustrating a lighting state in which no empty parking spaces are present in either of the left parking area and the right parking area of the three-way parking control camera apparatus with a parking space displaying function according to the present invention.

FIG. 8 is a diagram illustrating a lighting state in which no empty parking spaces are present in either of the left parking area and the right parking area of the three-way parking control camera apparatus with a parking space displaying function according to the present invention.

Referring to FIG. 8, from a point of view of the occupant of the vehicle entering the parking passage, since the front lighting part 140, the left lighting part 150, and the right lighting part 160 all emit the first color light, due to a lighting combination of the front lighting part 140, the left lighting part 150, and the right lighting part 160, a first color shape forms an arrow on both left and right sides so that the occupant of the vehicle entering the parking passage can clearly recognize that no empty parking spaces are present in the left and right parking areas.

Thus, according to the present invention, the occupants in the vehicle entering from the front side of the parking passage can easily recognize the direction of the parking areas on both sides of the parking passage in which there is an empty parking space so that user convenience can be improved.

Meanwhile, according to another aspect of the present invention, the three-way parking control camera apparatus 100 with a parking space displaying function may further include a body 180 and a body-fixing part 190.

The front camera 110, the left camera 120, the right camera 130, the front lighting part 140, the left lighting part 150, the right lighting part 160, and the controller 170 are mounted on the body 180.

In this case, the lenses of the front camera 110, the left camera 120, and the right camera 130 are exposed to the outside of body 180, an image sensor is installed to be hidden inside the body 180, and the front lighting LEDs 141, the left lighting LEDs 151, and the right lighting LEDs 161 of the front lighting part 140, the left lighting part 150, and the right lighting part 160 are installed inside the body 180 to be hidden and protected from being exposed to the outside by the front light-transmitting panel 142, the left light-transmitting panel 152, and the right light-transmitting panel 162.

Figure 9:
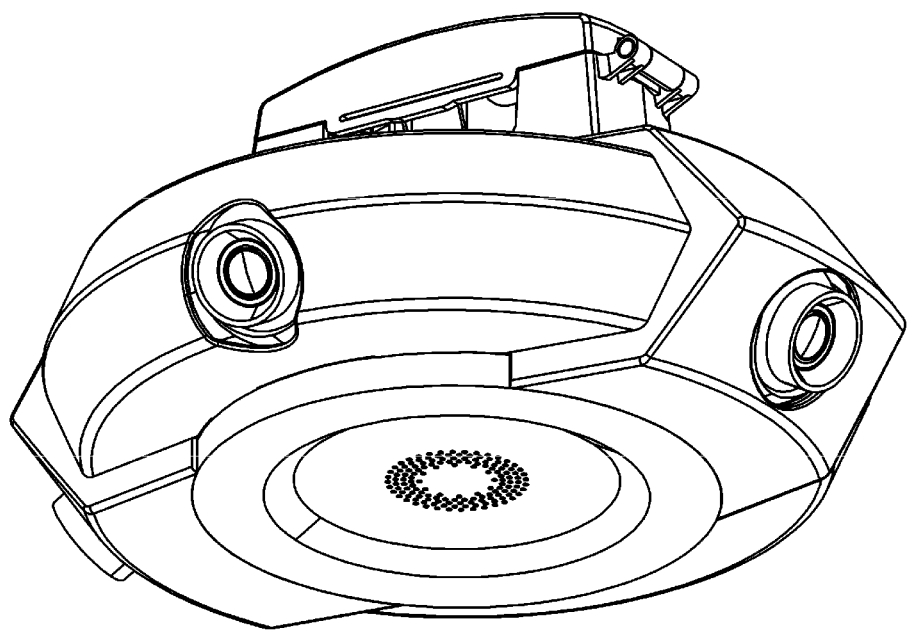
FIG. 9 is a diagram illustrating the three-way parking control camera apparatus with a parking space displaying function according to the present invention, which is fixed to a ceiling structure at the center of the parking passage.

The body-fixing part 190 is formed on an upper portion of the body 180 and is connected to a ceiling structure at the center of the parking passage through a clamp connection method. FIG. 9 is a diagram illustrating the three-way parking control camera apparatus with a parking space displaying function according to the present invention, which is fixed to a ceiling structure at the center of the parking passage, and it can be seen that the body-fixing part 190 is fixed to the ceiling structure at the center of the parking passage through a clamp connection method.

As described above, according to the present invention, the occupants in the vehicle entering from the front side of the parking passage can easily recognize the direction of the parking areas on both sides of the parking passage where there is an empty parking space so that user convenience can be improved.

The present invention can be used industrially in a parking control camera related technology field and its application technology field.

The various embodiments disclosed in the present specification and the accompanying drawings are merely provided for specific examples to aid understanding and are not intended to limit the scope of the various embodiments of the present invention.

Accordingly, it should be construed that, in addition to the embodiments described herein, the scope of the various embodiments of the present invention falls in the scope of the various embodiments of the present invention, and all changes or modified forms derived on the basis of the technical spirit of the various embodiments of the present invention are included in the scope of the various embodiments of the present invention.

What is claimed is:

1. A three-way parking control camera apparatus with a parking space displaying function, which is installed at a center of a parking passage to inform an occupant of a vehicle entering from a front side of the parking passage about a parking space situation on both sides of the parking passage, the three-way parking control camera apparatus comprising:
   a front camera configured to monitor forward to identify a vehicle entering from the front side of the parking passage;
   a left camera configured to monitor leftward to identify a parking space situation in a left parking area on a left side of the parking passage;
   a right camera configured to monitor rightward to identify a parking space situation in a right parking area on a right side of the parking passage;
   a first set of LEDs configured to emit light to allow the vehicle entering from the front side of the parking passage to recognize the parking space situation;
   a second set of LEDs configured to emit light to allow the vehicle entering from the front side of the parking passage to recognize whether a parking space is present in the left parking area;
   a third set of LEDs configured to emit light to allow the vehicle entering from the front side of the parking passage to recognize whether a parking space is present in the right parking area; and
   a controller configured to control overall functions of the three-way parking control camera apparatus.

2. The three-way parking control camera apparatus of claim 1, wherein the controller:
   determines whether an empty parking space is present in the left or right parking area from a left parking area image captured by the left camera and a right parking area image captured by the right camera;
   when an empty parking space is present in the left or right parking area, controls the first set of LEDs to emit first color light; and
   when no empty parking space is present in the left or right parking area, controls the first set of LEDs to emit second color light.

3. The three-way parking control camera apparatus of claim 2, wherein, when an empty parking space is present only in the left parking area and no empty parking space is present in the right parking area, the controller controls the second set of LEDs to emit the first color light and controls the third set of LEDs to emit the second color light.

4. The three-way parking control camera apparatus of claim 2, wherein, when no empty parking space is present in the left parking area and an empty parking space is present only in the right parking area, the controller controls the second set of LEDs to emit the second color light and controls the third set of LEDs to emit the first color light.

5. The three-way parking control camera apparatus of claim 2, wherein, when empty parking spaces are present in both of the left parking area and the right parking area, the controller controls both of the second set of LEDs and the third set of LEDs to emit the first color light.

6. The three-way parking control camera apparatus of claim 2, wherein, when no empty parking spaces are present in either of the left parking area and the right parking area, the controller controls both of the second set of LEDs and the third set of LEDs to emit the second color light.

7. The three-way parking control camera apparatus of claim 1, wherein the first set of LEDs includes:
    a plurality of front lighting light-emitting diodes (LEDs) configured to emit light vertically toward the ground; and
    a front light-transmitting panel which prevents the plurality of front lighting LEDs from being exposed to the outside and transmits light from the plurality of front lighting LEDs to allow the vehicle entering from the front side of the parking passage to recognize the light.

8. The three-way parking control camera apparatus of claim 7, wherein the second set of LEDs or the third set of LEDs includes:
    a plurality of left lighting LEDs or a plurality of right lighting LEDs configured to emit light horizontally toward the ground; and
    a left light-transmitting panel or a right light-transmitting panel which prevents the plurality of left lighting LEDs or the plurality of right lighting LEDs from being exposed to the outside and which transmits light of the plurality of left lighting LEDs or the plurality of right lighting LEDs to allow the vehicle entering from the front side of the parking passage to recognize the light.

9. The three-way parking control camera apparatus of claim 8, wherein the front light-transmitting panel is implemented in a form in which both ends are inserted into and coupled to the left light-transmitting panel and the right light-transmitting panel and is implemented to transmit light of the plurality of left lighting LEDs or the plurality of right lighting LEDs to the front side of the parking passage through bump portions of the left light-transmitting panel and the right light-transmitting panel, which are formed through the coupling with the front light-transmitting panel, thereby allowing the vehicle entering from the front side of the parking passage to recognize the light.

10. The three-way parking control camera apparatus of claim 1, further comprising:
    a body on which the front camera, the left camera, the right camera, the first set of LEDs, the second set of LEDs, the third set of LEDs, and the controller are mounted; and
    a body-fixing part camera formed on an upper portion of the body and connected to a ceiling structure at the center of the parking passage through a clamp connection method.

* * * * *